United States Patent [19]
Pryce et al.

[11] 3,871,253
[45] Mar. 18, 1975

[54] SLITTING OF AN ELECTRICALLY CHARGED TAPE

[75] Inventors: William Pryce, Amherst, Nova Scotia; Eric Foster, London, Ontario, both of Canada

[73] Assignee: Northern Electric Company Limited, Montreal, Quebec, Canada

[22] Filed: Feb. 19, 1974

[21] Appl. No.: 443,362

Related U.S. Application Data

[62] Division of Ser. No. 299,637, Oct. 20, 1972, Pat. No. 3,808,919.

[52] U.S. Cl. .................... 83/8, 83/9, 83/102, 83/425.2, 83/547
[51] Int. Cl. .................... B26d 3/08
[58] Field of Search .................... 83/6-8, 425-425.4, 83/547, 102, 9; 242/56.2-56.7

[56] References Cited

UNITED STATES PATENTS

| | | | |
|---|---|---|---|
| 3,459,078 | 8/1969 | Black | 83/8 |
| 3,566,726 | 3/1971 | Politis | 83/547 X |

*Primary Examiner*—J. M. Meister
*Attorney, Agent, or Firm*—Sidney T. Jelly

[57] ABSTRACT

An electrically charged tape is slit by first backing the charged tape with a metallized tape, the charged tape in contact with the non-metallic surface of the metallized tape. The combined tapes are then passed over one or more cutters. The charged tape is completely cut through but the backing tape is only cut partially through. Clean cut edges and minimal distortion is obtained, even for very thin tapes.

2 Claims, 4 Drawing Figures

SLITTING OF AN ELECTRICALLY CHARGED TAPE

This application is a division of application Ser. No. 299,637 filed Oct. 20, 1972, now U.S. Pat. No. 3,808,919.

This invention relates to the slitting of electrically charged tape and particularly to the slitting of such tape to a high degree of accuracy.

A typical example of a charged tape is one used for the manufacture of electret transducers. Such tape comprises a metallized plastic tape, the metal layer having an electrical charge imposed thereon. For the manufacture of electrect transducers the tape is slit to a predetermined width. It is desirable to keep a good edge to the tape and obviously the slitting must be done without destroying the electrical charge. The slit tape is then divided up into individual lengths for transducers, for example.

Slitting the tape has proved difficult in that distortion occurs and good control of the tape is difficult to obtain. The edges are often not cleanly cut.

The present invention provides for the slitting of a charged tape by passing the tape in slitting relationship with one or more cutters, the charged tape being backed with a separate second metallized tape. The second metallized tape is in contact with the charged tape with the metallized layer of the second tape touching the plastic portion of the charged tape.

The invention will be readily understood by the following description of one embodiment, by way of example, in conjunction with the accompanying diagrammatic drawings, in which.

Figure 1:
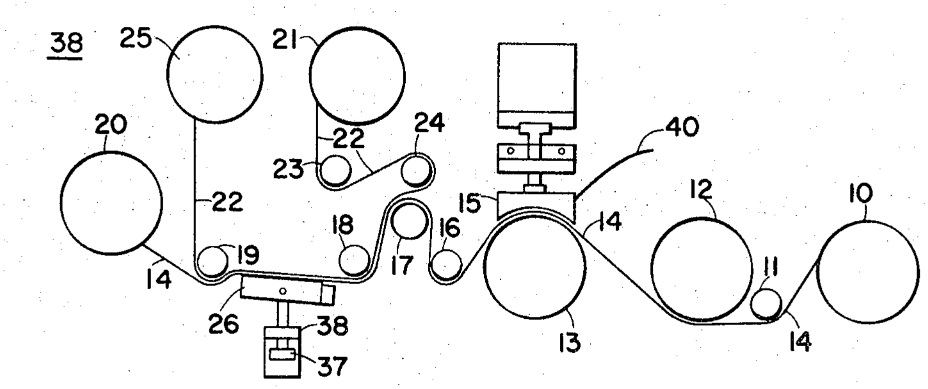
FIG. 1 is a side view of one form of slitting apparatus.

As illustrated in FIG. 1, an apparatus in accordance with one embodiment of the present invention includes the following: a spool 10 of metallized teflon tape, a flanged idler roller 11, a further idler roller 12 and a support roller 13. Support roller 13 supports and conveys the tape 14 beneath a charging head 15. From the support roller 13 the tape passes round a further flanged roller 16 onto a further roller 17, under first and second guide rollers 18 and 19. Finally a take-up spool 20 winds up the tape.

Also included is a spool 21 of metallized nylon tape 22. The tape 22 passes from the spool 21 round the flanged roller 23 and over a roller 24. At this position the tape 22 is brought into contact with the tape 14. Tape 22 passes with tape 14 under the first and second guide rollers 18 and 19. After passing under guide roll 19 the tapes are separated. The tape 22 is then wound up on take-up spool 25.

Between the first and second guide rollers 18 and 19 the tapes 14 and 22 pass in slitting relationship with slitter 26. The slitter 26 is seen more clearly in FIGS. 2 and 3. The slitter comprises two cutting blades 30 held in a holder of three portions 31, 32 and 33, in a sandwich formation. Screws 23 hold the portions 31, 32 and 33 and the blades 30 together. Portion 32 acts as a spacer and corresponds to the width of the slit tape required.

Figures 2, 3:
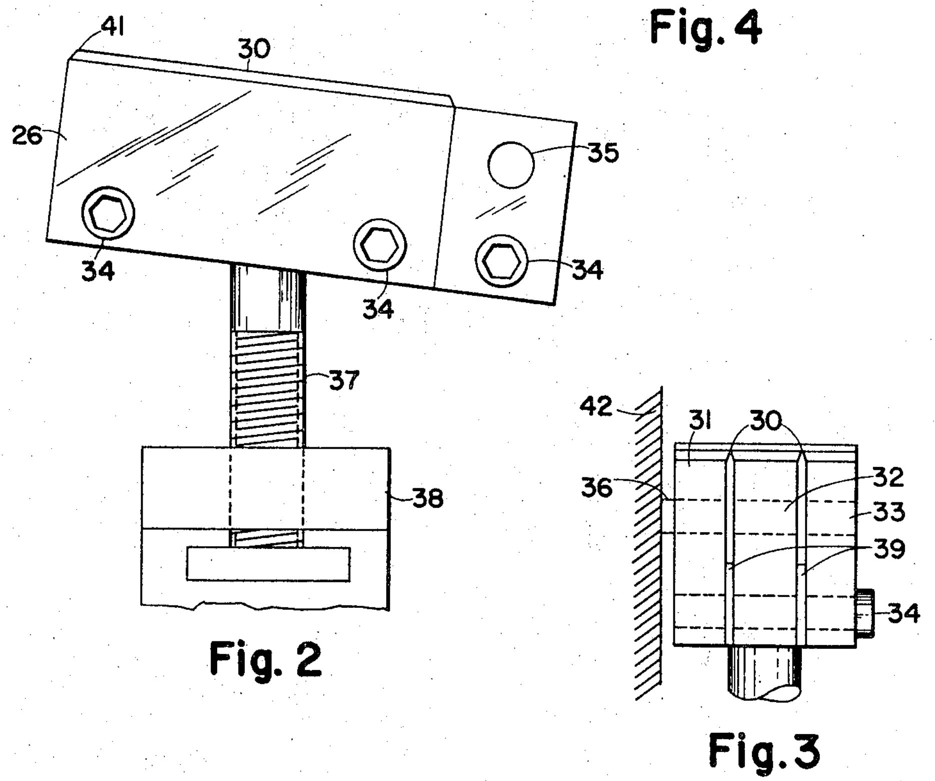
FIG. 2 is a side view of one detail of the apparatus of FIG. 1 to a larger scale.
FIG. 3 is an end view of part of the detail illustrated in FIG. 2.

The portion 32 extends laterally and has a bore 35 which is adapted to fit over a pivot post indicated at 36 (FIG. 3). An adjusting screw 37 is supported in a bracket 38 via a threaded hole and acts to move the slitter 26 up and down by rotation about the pivot post 35. For convenience the blades 30 only extend downwards for part of the depth of the slitter, spacers 39 being positioned on the screws 34. The spacers 39 are very slightly thinner than the blades which are readily replaced.

The pivot post 36, plus the supports for the spools 10, 20, 21 and 25 and the rollers 11, 13, 16, 17, 19, 23 and 24 are all carried by a back plate 42. Driving means, not shown, are provided to rotate the take-up spools 20 and 25 which pull the tapes 14 and 22 through the apparatus. One or more of the rollers can also be driven, if desired.

While passing over the support roller 13 beneath the charging head 15, the tape 14 is charged by the imposition of a permanent electrical charge onto the metallized layer of the tape 14. The charging head 15 is of a conventional form for applying an electrical charge to the metallized tape. For example it is a corono charging head, the characteristics of the charge controlled in a known manner. The metal layer of the tape 14 is in contact with the roller 13 and the charge is imposed through the teflon tape. Electrical leads to the charging head 15 are indicated at 40.

The metallized tape 14 is relatively thin and fragile and hitherto difficulties have been experienced in cutting the charged tape to a consistent width and with clean edges. It will be appreciated that the necessity of consistent width arises from the need to produce final products, that is electrets, having electrical characteristics which are consistent and within close specification tolerances. Edges which are not clean will also produce variations in the electrical characteristics.

Figure 4:
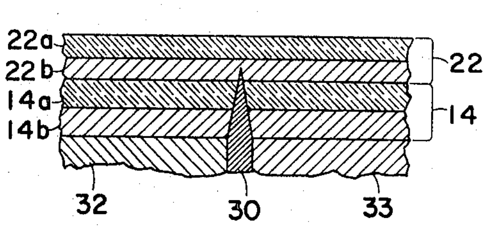
FIG. 4 is a cross-section through a tape being slit, to a greatly enlarged scale, illustrating the method of slitting.

By passing the charged metallized tape 14 over the slitter 26 in association with a further metallized tape 22, slitting to a high accuracy, with clean edges, is obtained. The charged metallized tape 14 will cling to the further tape 22 because of the charge without affecting the charge. Thus the two tapes co-act together and form a tape which is more readily guided and thus passes over the slitter 26 without distortion, giving accurate slitting. The metallized tape 14 is extremely thin and distorts readily under cutting loads when unsupported. The combined tape is not cut completely through. The cutting blades 30 cut, or slit, completely through the charged metallized tape 14 but only part way, for example halfway through the further tape. This ensures clean cut edges. This is seen in FIG. 4, a cutter blade 30 being shown, the charged metallized tape 14 comprising the teflon backing tape 14*a* and the metallized layer 14*b*, and the supporting or further tape 22 comprising the mylar backing tape 22*a* and the metallized layer 22*b*. After slitting the tapes are separated at roller 19, FIG. 1, and wound up on the take-up spools 20 and 25. The central portion of the slit tape 14 is normally only that part used, the edge portions being discarded, but this can be varied. The depth of penetration of the cutter blades 30 into the support tape 22 can be adjusted by altering the height of the slitter 26 by means of the adjusting screw 37. Only the corners 41 of the cutting blades 30 are used.

What is claimed is:

1. Apparatus for slitting an electrically charged tape, comprising:

a slitter having two cutting blades spaced a predetermined distance apart, means for passing an electrically charged metallized tape in slitting relationship with said slitter;

means for feeding a metallized support tape into contact with the charged tape, prior to slitting, whereby the two tapes will be in contact during slitting;

means for separating the tapes after slitting, the tapes when in contact arranged so that the metallized layers are separated by the backing layer of a tape; and means for adjusting the slitter to control the degree of penetration of the cutter blades into said further metallized tape, the charged tape completely slit through and the support tape partially slit through.

2. Apparatus as claimed in claim 1 further including means for applying an electrical charge to an uncharged metallized tape.

* * * * *